US011602959B2

United States Patent
McCarthy (10) Patent No.: US 11,602,959 B2
(45) Date of Patent: Mar. 14, 2023

(54) PUNCTURE DETECTOR WITH ROTATABLE ELEMENT

(71) Applicant: Martin Kevin McCarthy, Doncaster (GB)

(72) Inventor: Martin Kevin McCarthy, Doncaster (GB)

(73) Assignee: Martin Kevin McCarthy, Doncaster South (GB)

( * ) Notice: Subject to any disclaimer, the term of this patent is extended or adjusted under 35 U.S.C. 154(b) by 0 days.

(21) Appl. No.: 17/493,324

(22) Filed: Oct. 4, 2021

(65) Prior Publication Data

US 2022/0111689 A1 Apr. 14, 2022

(30) Foreign Application Priority Data

Oct. 8, 2020 (GB) .................................... 2015939

(51) Int. Cl.
*B60C 25/00* (2006.01)
*G01M 3/02* (2006.01)
*G01M 3/14* (2006.01)

(52) U.S. Cl.
CPC ............ *B60C 25/002* (2013.01); *B60C 25/16* (2013.01); *G01M 3/027* (2013.01); *G01M 3/14* (2013.01)

(58) Field of Classification Search
CPC ............ B60C 23/0408; B60C 23/0496; B60C 23/061; B60C 23/0494; B60C 23/0416; B60C 23/0433; B60C 23/0493; B60C 23/04; B60C 19/00; B60C 23/0479; B60C 23/0467; B60C 23/0462; B60C 23/0411; B60C 23/041; B60C 11/24; B60C 33/20; B60C 23/0444; B60C 23/064; B60C 23/007; B60C 23/02; B60C 23/06; B60C 23/0401; B60C 23/0488; B60C 23/062; B60C 23/0413; B60C 23/0452; B60C 11/246; B60C 23/0442; B60C 23/00354;
(Continued)

(56) References Cited

U.S. PATENT DOCUMENTS 1,111,985 A 9/1914 Anderson
5,618,991 A 4/1997 Levinrad

FOREIGN PATENT DOCUMENTS

AU 2015357410 A1 * 6/2017 .......... G01M 3/3218
CN 2487577 Y 4/2002
(Continued)

OTHER PUBLICATIONS

Corresponding Great Britain Patent Application No. GB2015939.8, Search Report dated Jan. 28, 2021.
(Continued)

*Primary Examiner* — Andre J Allen
(74) *Attorney, Agent, or Firm* — Cooper Legal Group, LLC (57) ABSTRACT

An apparatus for detecting a puncture comprises a housing comprising a plurality of compartments. Each compartment comprises an opening for receiving a flow of air into the compartment. Each compartment also comprises a detection element mounted on an axle, the axle having a first end and a second end and being secured at said first end and said second end within the compartment. The detection element is rotatable about the axle and when a flow of air passes through the opening into the compartment, the detection element rotates around the axle in response to the flow of air.

18 Claims, 13 Drawing Sheets

(58) Field of Classification Search
CPC . B60C 23/043; B60C 99/006; B60C 23/0498; B60C 2019/004; B60C 23/0428; B60C 23/00318; B60C 23/00372; B60C 23/04985; B60C 23/009; B60C 23/0425; B60C 11/243; B60C 23/004; B60C 23/0403; B60C 23/045; B60C 23/00363; B60C 23/0464; B60C 29/02; B60C 23/0483; B60C 23/0472; B60C 23/066; B60C 11/00; B60C 23/0406; B60C 23/006; B60C 23/008; B60C 23/044; B60C 23/00; B60C 23/0454; B60C 25/002; B60C 23/0455; B60C 23/0461; B60C 2200/02; B60C 23/0415; B60C 23/0422; B60C 23/0474; B60C 23/0489; B60C 29/064; B60C 23/0481; B60C 23/0491; B60C 23/0405; B60C 23/0471; B60C 23/0459; B60C 23/0477; B60C 11/0318; B60C 23/00336; B60C 2019/005; B60C 23/042; B60C 23/002; B60C 23/00345; B60C 25/132; B60C 29/06; B60C 13/001; B60C 23/0437; B60C 23/0466; B60C 23/0476; B60C 9/18; B60C 23/0423; B60C 23/0449; B60C 25/142; B60C 23/0447; B60C 23/08; B60C 25/00; B60C 13/00; B60C 17/00; B60C 19/003; B60C 2019/006; B60C 23/0427; B60C 23/0484; B60C 23/0486; B60C 23/065; B60C 29/00; B60C 17/02; B60C 23/001; B60C 23/0445; B60C 5/004; B60C 9/02; B60C 23/0457; B60C 25/145; B60C 11/0083; B60C 11/13; B60C 23/0418; B60C 23/0469; B60C 23/127; B60C 25/18; B60C 11/0332; B60C 23/0432; B60C 23/063; B60C 23/068; B60C 23/126; B60C 25/005; B60C 25/138; B60C 5/14; B60C 99/003; B60C 11/03; B60C 11/12; B60C 13/02; B60C 17/04; B60C 17/06; B60C 23/00305; B60C 23/005; B60C 23/135; B60C 23/137; B60C 25/007; B60C 25/0554; B60C 25/14; B60C 29/04; B60C 29/062; B60C 29/066; B60C 3/00; B60C 11/0302; B60C 11/032; B60C 11/11; B60C 13/003; B60C 19/001; B60C 2011/1213; B60C 2011/1231; B60C 2011/1245; B60C 23/00347; B60C 23/10; B60C 23/131; B60C 23/16; B60C 25/056; B60C 29/005; B60C 29/068; B60C 3/04; B60C 5/142; B60C 7/12; B60C 9/20; B60C 99/00; B60C 11/01; B60C 11/02; B60C 11/0304; B60C 11/0306; B60C 15/06; B60C 17/0009; B60C 19/002; B60C 19/08; B60C 19/12; B60C 2009/2025; B60C 2009/2038; B60C 2011/0374; B60C 2011/0388; B60C 2200/065; B60C 23/0435; B60C 23/067; B60C 23/121; B60C 23/123; B60C 23/133; B60C 23/18; B60C 25/02; B60C 25/05; B60C 25/15; B60C 29/007; B60C 5/001; B60C 5/20; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2011/0033; B60C 2011/0358; B60C 2011/1254; B60C 2017/068; B60C 2019/007; B60C 2200/06; B60C 2200/12; B60C 2200/14; B60C 25/0503; B60C 25/0515; B60C 25/0521; B60C 25/0548; B60C 25/0551; B60C 25/16; B60C 3/06; B60C 5/002; B60C 5/02; B60C 7/00; B60C 7/105; B60C 7/107; B60C 9/005; B60C 9/1807; B60C 9/28
USPC .................................................. 73/146–146.8
See application file for complete search history.

(56) References Cited

FOREIGN PATENT DOCUMENTS

| | | |
|---|---|---|
| CN | 103273669 A | 9/2013 |
| FR | 723048 A | 4/1932 |
| GB | 123877 A | 3/1919 |
| GB | 185350 A | 9/1922 |
| GB | 2310640 A | 9/1997 |
| GB | 2577739 A | 4/2020 |
| GB | 2577875 A | 4/2020 |

OTHER PUBLICATIONS

Corresponding Great Britain Patent Application No. GB1816248.7, Search Report dated Mar. 19, 2019.
Corresponding Great Britain Patent Application No. GB1816249.5, Search Report dated Mar. 15, 2019.
Graham How, "Puncture Finder", https://www.innovate-design.co.uk/innovate-reviews/case-studies/puncture-finder/, Jan. 24, 2018. Entire Document.

* cited by examiner

Fig. 13

PUNCTURE DETECTOR WITH ROTATABLE ELEMENT

CROSS REFERENCE TO RELATED APPLICATIONS

This application claims priority from United Kingdom Patent Application number 20 15 939.8, filed on 8 Oct. 2020, the whole contents of which are incorporated herein by reference.

BACKGROUND OF THE INVENTION

The present invention relates to an apparatus for detecting a puncture and a method of detecting a puncture hole.

When riding a bicycle, a source of frustration for many riders is when a puncture occurs while on a ride. Often this means that riders are either forced to repair the puncture themselves while out by means of a suitable tool kit which they carry with them. Alternatively, in the absence of such a tool kit, they may find themselves walking home with their bicycle and ending the bike ride early.

A puncture detection tool is provided in the applicant's earlier application, published as GB 2 577 875. This disclosure provides a detector which contains floatation elements in the form of polystyrene balls which, when passed over the inner tube of the bicycle tire, enables a puncture hole to be detected. The polystyrene balls move when air flows in to compartments of the housing of the detector as the detector is passed over the puncture hole.

This solution has a number of limitations. The detector must be used horizontally as when the flotation balls are held away from the horizontal, they move to one side of the compartments and do not activate adequately when the detector is passed over a puncture hole.

The polystyrene balls themselves also have the problem of clumping together due to their static charge which again prevents them from activating effectively. To solve this, the inventor has attempted to utilize plastic balls as an alternative, however, these do not work effectively as they are too heavy for the limited amount of air flow into the compartments to provide a suitable reading. These issues also mean that accurately seeing and reading the movement of the balls can also be difficult or erroneous.

There remains a need for an alternative approach which addresses these limitations.

BRIEF SUMMARY OF THE INVENTION

According to an aspect of the present invention, there is provided an apparatus for detecting a puncture, comprising: a housing comprising a plurality of compartments; each said compartment comprising: an opening for receiving a flow of air into said compartment, and a detection element mounted on an axle, said axle having a first end and a second end and being secured at said first end and said second end within each said compartment; wherein said detection element is rotatable about said axle; and when a flow of air passes through said opening into said compartment, said detection element rotates around said axle in response to said flow of air.

According to a second aspect of the present invention, there is provided a method of detecting a puncture hole, comprising the steps of: receiving an apparatus for detecting a puncture, said apparatus comprising a housing comprising a plurality of compartments, each said compartment comprising an opening for receiving a flow of air into said compartments, and a detection element mounted on an axle secured at a first end and a second end in each said compartment; positioning said apparatus over an inner tube; moving said apparatus along the surface of said inner tube such that a flow of air passes through each said opening when said opening passes over the puncture hole thereby rotating said corresponding detection element around said axle; and identifying the location of said puncture hole.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art. Components and processes distinguished by ordinal phrases such as "first" and "second" do not necessarily define an order or ranking of any sort.

DETAILED DESCRIPTION OF EMBODIMENTS OF THE INVENTION

FIG. 1

Figure 1:
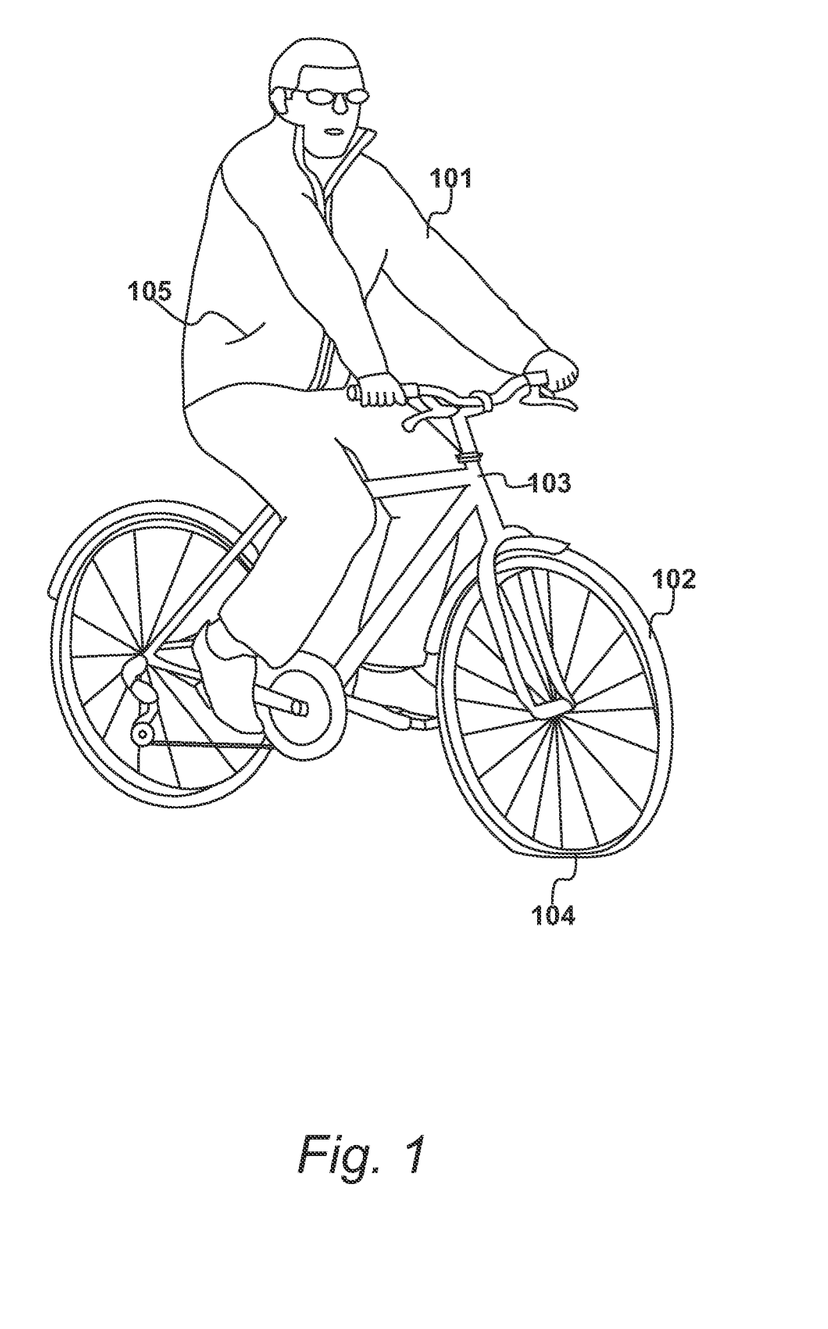
FIG. 1 shows a typical scenario involving a cyclist riding a bicycle.

A cyclist 101 is shown riding a bicycle in a typical scenario in FIG. 1. In the illustrated embodiment, the front tire 102 of bicycle 103 has experienced a puncture 104 which includes damage to the inner tube of the tire.

Thus, cyclist 101 must either repair puncture 104 or otherwise find means to get home without riding bicycle 103. The present invention therefore seeks to provide a means by which to repair and detect the location of the puncture on the inner tube.

In the embodiment, apparatus in accordance with the present invention is configured to be portable and lightweight, and in the embodiment, the apparatus is easily transportable by cyclist 101 and may be carried on their person, for example, in pocket 105. Thus, the apparatus as described herein may comprise part of a portable tool kit to enable repair of a puncture on a bicycle.

FIG. 2

Figure 2:
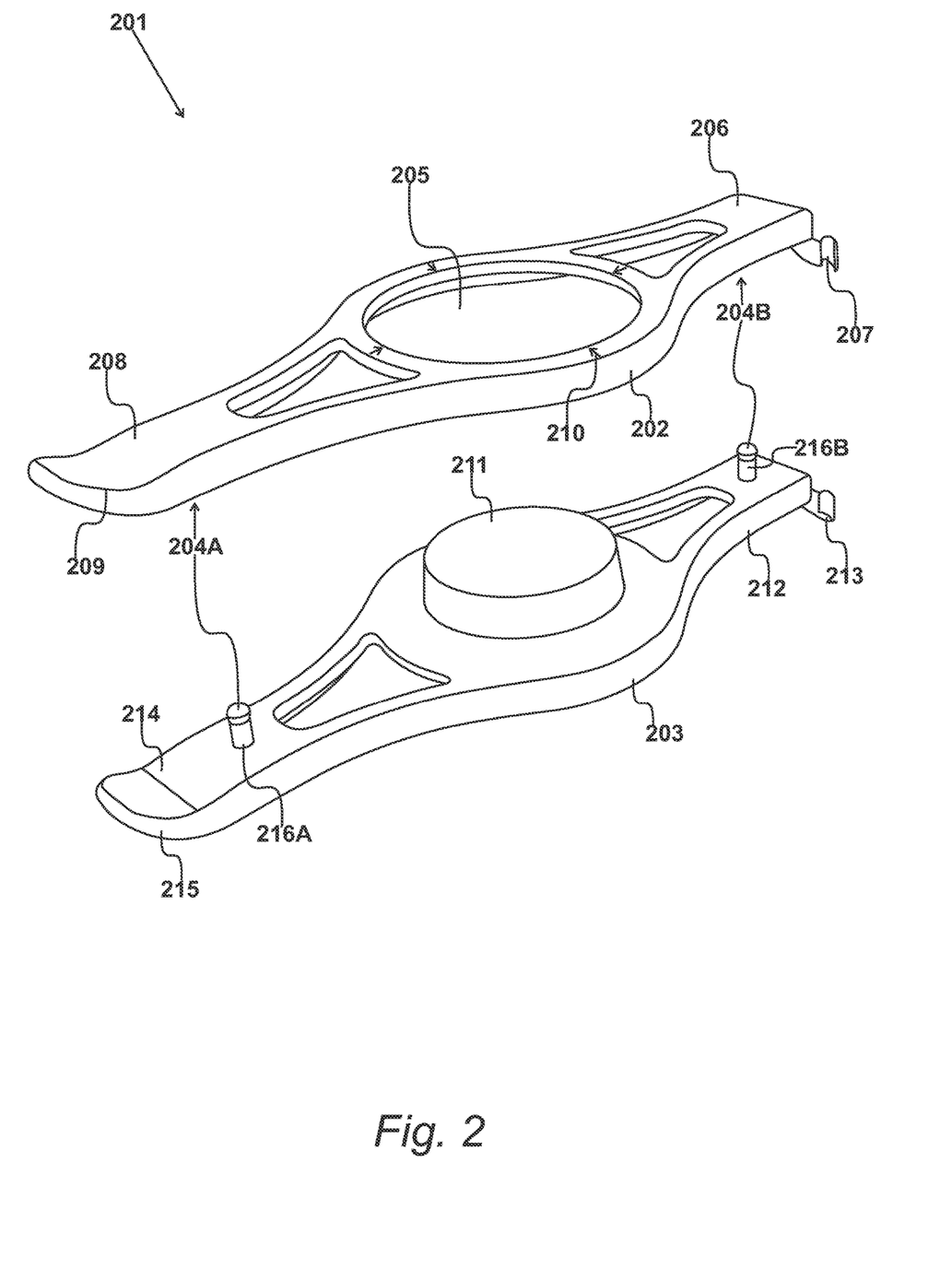
FIG. 2 shows an apparatus for repairing a puncture.

Apparatus 201 for repairing a puncture is shown in FIG. 2. Apparatus 201 comprises a first elongate portion 202 and a second elongate portion 203. In respect of FIG. 2, apparatus 201 is shown in exploded form whereby first elongate portion 202 and second elongate portion 203 are shown separate to each other. However, apparatus 201 further comprises a clamping means 204 which is configured to removably secure the first and second elongate portions 202 and 203 together as necessary.

First elongate portion 202 comprises an aperture 205 which comprises a central circular cross section through first elongate portion 202. First elongate portion 202 further comprises a first end 206 which comprises a hooking means 207 which is suitable for securing first elongate portion 202 to a bicycle wheel spoke. In the embodiment, first elongate portion 202 comprises a second end 208, substantially opposite to first end 206 which comprises a lever 209 which is suitable for removing a bicycle tire from a bicycle wheel rim.

In the embodiment, aperture 205 is positioned between first end 206 and second end 208 and first elongate portion 202 comprises a visual indicator 210 to indicate a puncture site in use. In this example, visual indicator 210 comprises a plurality of arrow-shaped indicators situated around the circumference of aperture 205, although in alternative embodiments, it is appreciated that alternative visual indicators may be present.

Referring now to second elongate portion 203, it is appreciated that second elongate portion 203 is substantially similar in length and outer width to first elongate portion 202 and this assists in securing the first and second elongate portions together in use. Second elongate portion 203 differs from first elongate portion 202 in particular by comprising a protrusion 211 as opposed to an aperture. Protrusion 211 comprises a central circular cross section that is substantially similar in size and diameter to the central circular cross section of aperture 205. In this way, protrusion 211 is configured to align with aperture 205 in use such that protrusion 211 extends through aperture 205 when first elongate portion 202 and second elongate portion 203 are secured together. This will be explained in further detail with respect to FIG. 12.

Similar to first elongate portion 202, second elongate portion 203 further comprises a first end 212 which comprises a hooking means 213 which is suitable for securing second elongate portion 203 to a bicycle wheel spoke. Second elongate portion 203 also comprises a second end 214, substantially opposite to first end 212 which comprises a lever 215 which is suitable for removing a bicycle tire from a bicycle wheel rim. It is appreciated that, in the embodiment, the respective hooking means and levers of each of the first and second elongate portions are substantially similar to each other. It is further appreciated that, in alternative embodiments, only one of the first and second elongate portions may comprise one or either of the hooking means and/or lever.

Figure 6:
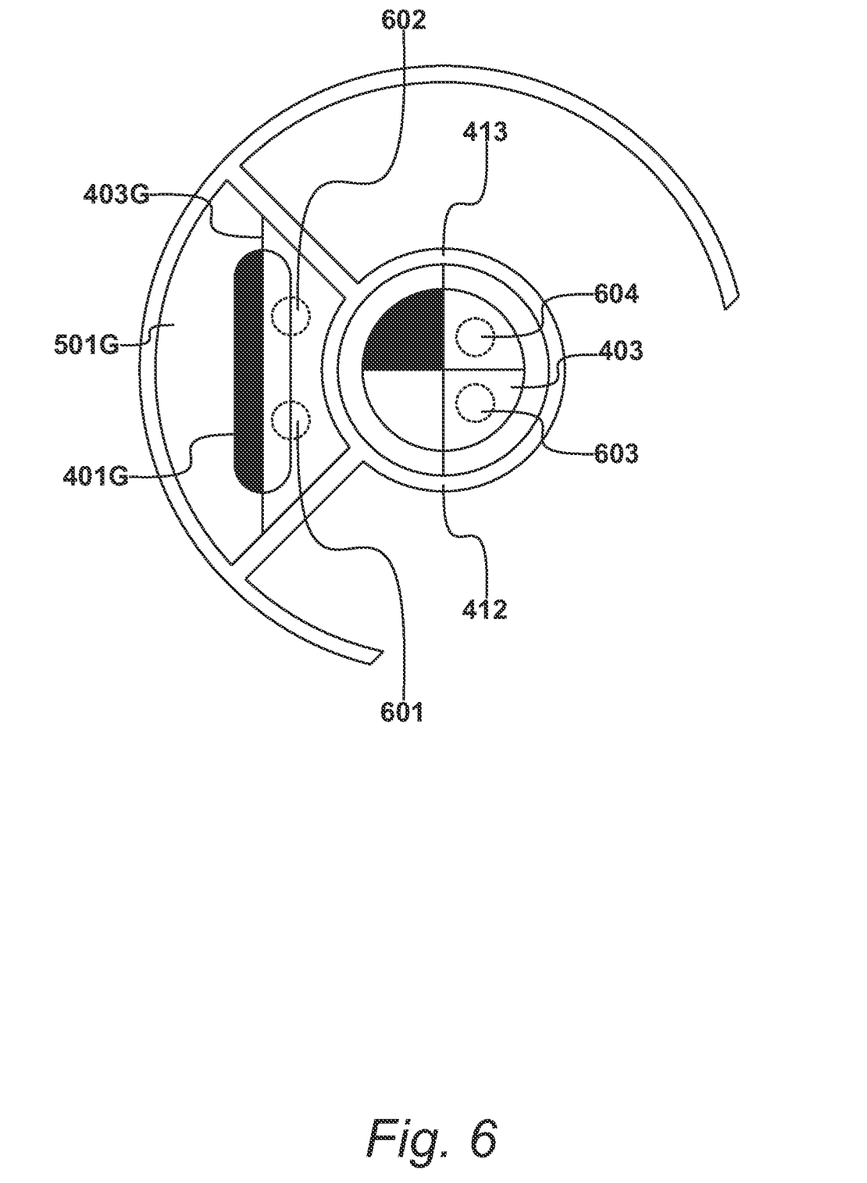
FIG. 6 shows a schematic view of the housing of the detecting apparatus showing compartments having openings.

In the embodiment, clamping means 204 comprises a clip which comprises at least one plug and at least one socket. First elongate portion 202 comprises two sockets positioned on an under-surface of first elongate portion 202 as best shown in FIG. 6. Second elongate portion 203 therefore comprises two corresponding plugs 216 and together the plugs and sockets mutually co-operate to secure first elongate portion 202 to second elongate portion 203 in use.

In the embodiment, first and second elongate portions 202 and 203 comprise a plastic material which has been injection-molded. The plastic material may be any suitable thermoplastic material and, in specific embodiments, may be polypropylene (PP), acrylonitrile butadiene styrene (ABS) or polyethylene (PE). It is appreciated that apparatus 201 may, in alternative embodiments, be comprised of an alternative material. The material is preferably lightweight however so as to enable apparatus 201 to be carried around by a cyclist when riding the bicycle in the manner shown in FIG. 1.

In some embodiments, apparatus 201 is provided in alternative colors or with suitable branding thereon depending on retailer requirements. In particular, branding may be applied to the protrusion or the top surface of either elongate portion.

Apparatus 201 can therefore be utilized to assist with the repair of a bicycle wheel puncture. To enable this, first elongate portion 202 is secured to a bicycle wheel spoke by hooking means 207 while lever 209 is utilized to assist in removing the inner tube from the bicycle wheel. Second elongate portion 203 and its respective lever 215 is also used in the manner of a conventional lever to remove inner tube from the bicycle wheel.

FIG. 3

Figure 3:
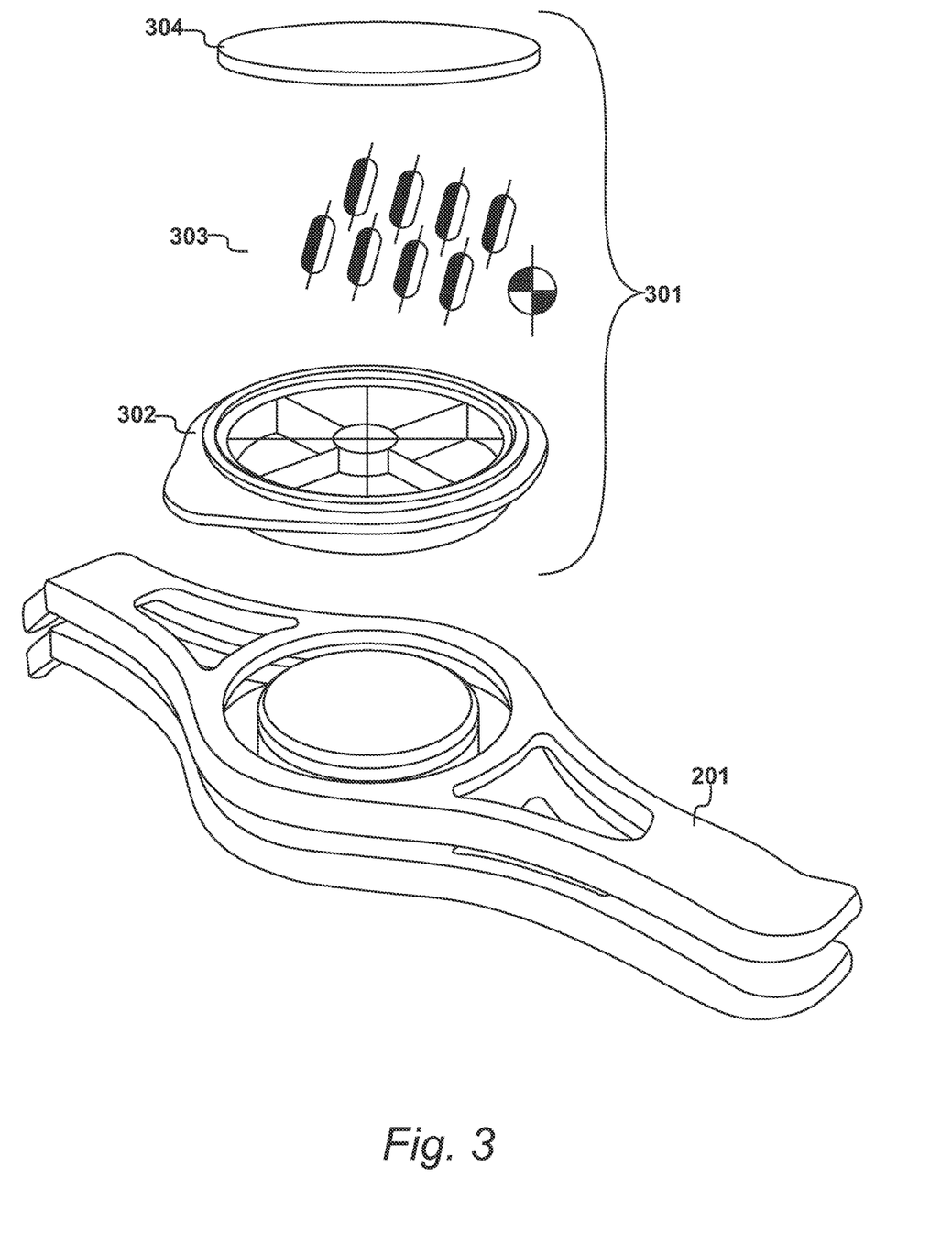
FIG. 3 shows an apparatus for detecting or locating a puncture hole.

Once inner tube 302 has been removed from bicycle wheel, the puncture hole in the inner tube in need of repair can be located by means of the present invention.

The present invention provides a means in which to locate a puncture hole in an inner tube. In the embodiment, a method of locating or detecting a puncture comprises using a puncture detection device to locate the puncture hole.

Apparatus for detecting a puncture 301, also known as a puncture detection device is shown in an exploded form in FIG. 3. Apparatus for repairing a puncture 201, also referred to as a repair device, is also shown in FIG. 3. Thus, it is appreciated that apparatus 201 and apparatus 301 are suitable for using in combination with each other, and in a preferred embodiment, are supplied as part of a tool kit in which both apparatus 201 and 301 are provided.

Apparatus 301 comprises a housing 302. Housing 302 comprises a plurality of compartments which will be described further in respect of FIG. 5. Apparatus 301 further comprises a plurality of detection elements 303, which are mounted on an axle, and will be described further in FIG. 4.

Apparatus 301 further comprises a cover 304. Cover 304, in use, fits over housing 302. In the embodiment, cover 304 is substantially transparent allowing the detection elements 303 to be viewed in use.

In the embodiment, housing 302 comprises a plastic material which may be any suitable plastic material. In an embodiment, the plastic material comprises polypropylene and may be injection-molded. Thus, housing 302 may comprise a similar material and method of manufacture to apparatus 201.

Figure 4A:
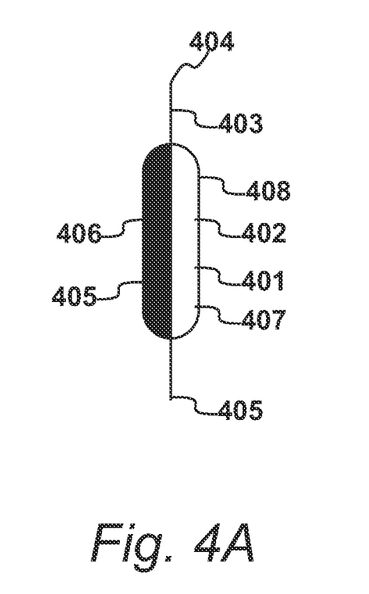
FIG. 4A and FIG. 4B show two example detection elements in accordance with the present invention.
Figure 4B:
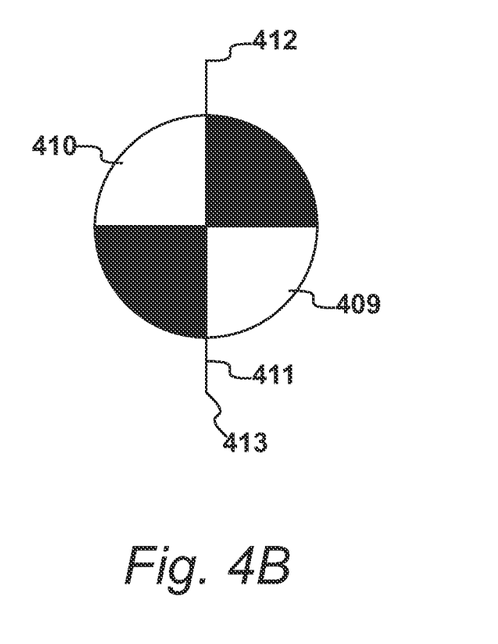

FIG. 4A and FIG. 4B

FIG. 4 shows two example detection elements in accordance with the present invention. Each detection element is mounted on an axle and may be substantially similar to any one of the detection elements 303 previously described in FIG. 3.

FIG. 4A shows a single detection element 401 in plan view. Detection element 401 comprises a substantially oblong shaped body 402 which is mounted to axle 403. Body 402 is freely connected to axle 403 such that body 402 can rotate around axle 403 in response to a flow of air thereon.

In the embodiment, axle 403 comprises a first end 404 and a second end 405 and detection element 401 is mounted between ends 404 and 405.

Detection element 401 comprises a visual element configured to provide an indication of rotation as detection element 401 rotates around axle 403. In the embodiment, visual element, comprises a colored pattern having a first color 405 depicted on a first side 406 of detection element 401, and a second color 407 depicted on a second, substantially opposite side 408 of detection element 401.

Thus, as detection element 401 rotates about axle 403 an operative can easily visualize the change in orientation of detection element 401.

Referring to FIG. 4B, an alternative detection element 409 is shown in plan view. Detection element 409 comprises a body 410 having a substantially circular cross-section. It is appreciated, however, that alternative cross-sectional designs may be utilized in alternative embodiments.

Body 410 is, like body 402, mounted to axle 403 and is freely connected to axle 411 such that body 410 can rotate around axle 411 in response to a flow of air thereon. In the embodiment, axle 411 comprises a first end 412 and a second end 413 and detection element 409 is mounted between ends 412 and 413.

Detection element 409 comprises a visual element configured to provide an indication of rotation as detection element 409 rotates around axle 411. In the embodiment, visual element comprises a visual pattern to assist with visual identification. In this embodiment, the visual pattern may include particular colors, but is arranged in an eye-catching manner to assist an operative in identifying rotation of detection element 409.

Thus, as detection element 409 rotates about axle 403 an operative can easily visualize the change in orientation of detection element 409.

In the embodiment, a combination of the two different types of detection element described here may be utilized in a single detection device. It is appreciated however, that, in alternative embodiments, any combination of detection elements may be used to provide a suitable visual effect to assist in identification of the puncture hole when utilizing the device.

FIG. 5

Figure 5:
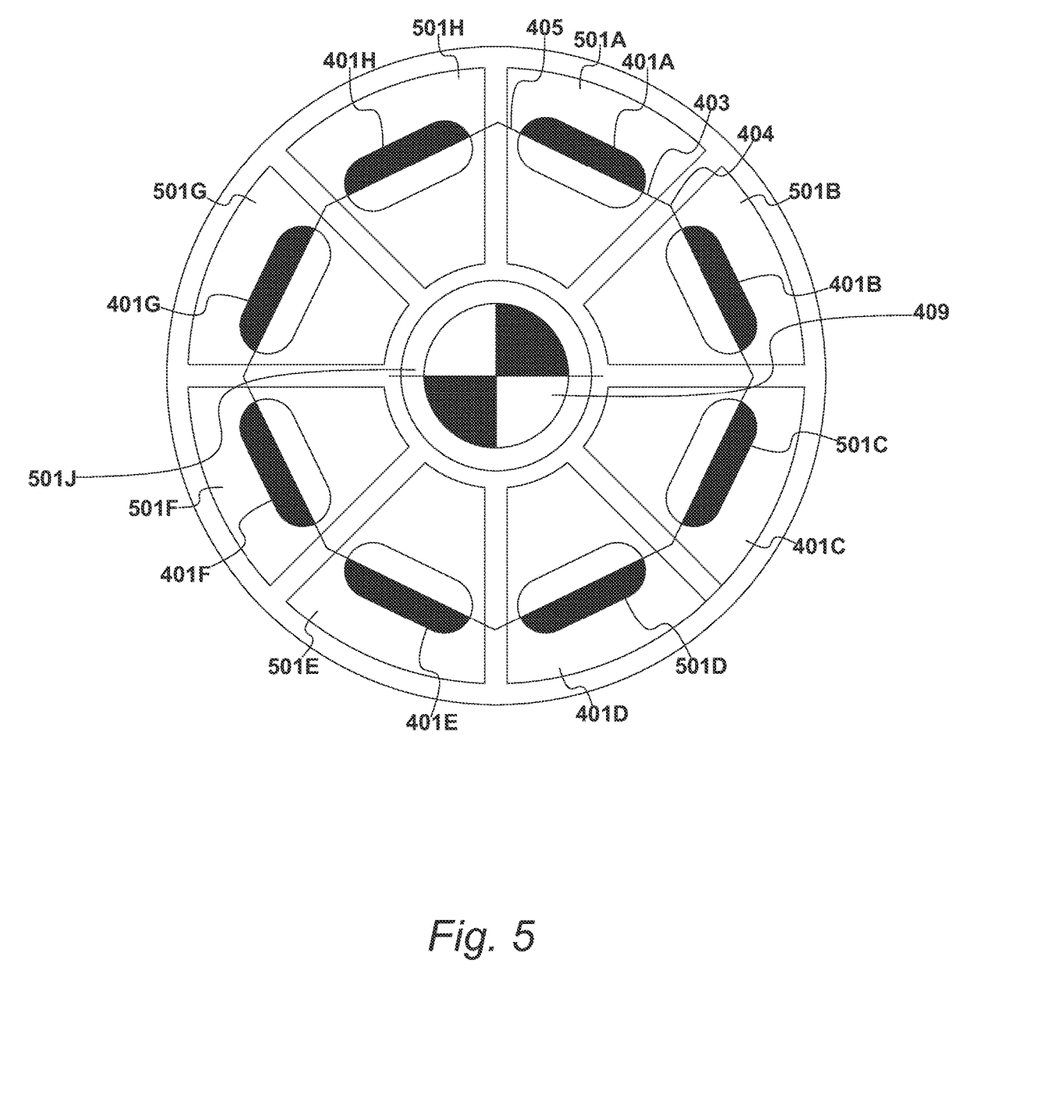
FIG. 5 shows a plan view of the housing of an apparatus for detecting a puncture.

A plan view of housing 302 in isolation is shown in FIG. 5. As noted previously, housing 302 comprises a plurality of compartments 501. Each compartment comprises a detection element, which is substantially similar to either detection element 401 or detection element 409 or a similar alternative.

In the embodiment, as shown, the plurality of compartments 501 are arranged in concentric circles, with compartments 501A, 501B, 501C, 501D, 501E, 501F, 501G and 501H arranged in an outer concentric circle, with compartment 501J arranged as a single center compartment.

It is appreciated that housing 302 in this embodiment is substantially circular in cross section, and the compartments are arranged as such in respect of this. In alternative embodiments, however, it is appreciated that apparatus 301 may function in a substantially similar manner if housing 302 is an alternative shape, such as a square, with divided compartments therein. Thus, any other suitable shape for housing may be utilized.

In this illustrated embodiment, outer compartments 501A to 501H comprise detection elements 401, and center compartment 501J comprises detection element 409.

In each case, each detection element 401 and 409, being mounted onto their respective axles is secured at the first end and second end of their axles to the compartment. This enables the detection element to rotate while maintaining the detection element in a consistent position for repeated use.

For example, taking detection element 401A in compartment 501A, axle 403 is fixed to wall 502 of compartment 501A at first end 404 of axle 403 and to wall 503 of compartment 501A at the second end 405 of axle 403. However, detection element 401 is still free to rotate about axle 403 when acted on by a flow of air.

FIG. 6

In order to affect rotation of each detection element about its axle, each compartment 501 comprises an opening for receiving a flow of air into the compartment. In FIG. 6, a schematic view of housing 302 is shown illustrating compartments 501G and 501J.

Referring first to compartment 501G, detection element 401G is shown mounted to compartment 501G by means of its axle 403G. In the embodiment, housing 302 comprises openings 601 and 602 for receiving a flow of air into said compartment. In the embodiment, each compartment comprises two similar openings positioned on the underside of the compartment and offset from the rotational axis of axle 403 as shown. The offset nature of the openings 601 and 602 ensure that detection elements 401 rotate effectively as air is brought through the openings thereby enabling detection of the puncture hole in question.

Referring now to compartment 501J, detection element 401 is again mounted by its axle 411 at ends 412 and 413 to secure it in position in compartment 501J. In compartment 501J, openings 603 and 604 are included to allow a flow of air into compartment 501J. Again, each opening is offset from the rotational axis of the axle 411. As with the oblong shaped detection elements 401, this allows continuous rotation as necessary to ensure that detection of a puncture hole can be made effectively.

In the embodiment, each compartment comprises two openings per compartment. It is appreciated, however, that a single opening or a plurality of openings may also be utilized, provided they enable the detection element in question to rotate effectively as air flows therethrough.

FIG. 7

Figure 7:
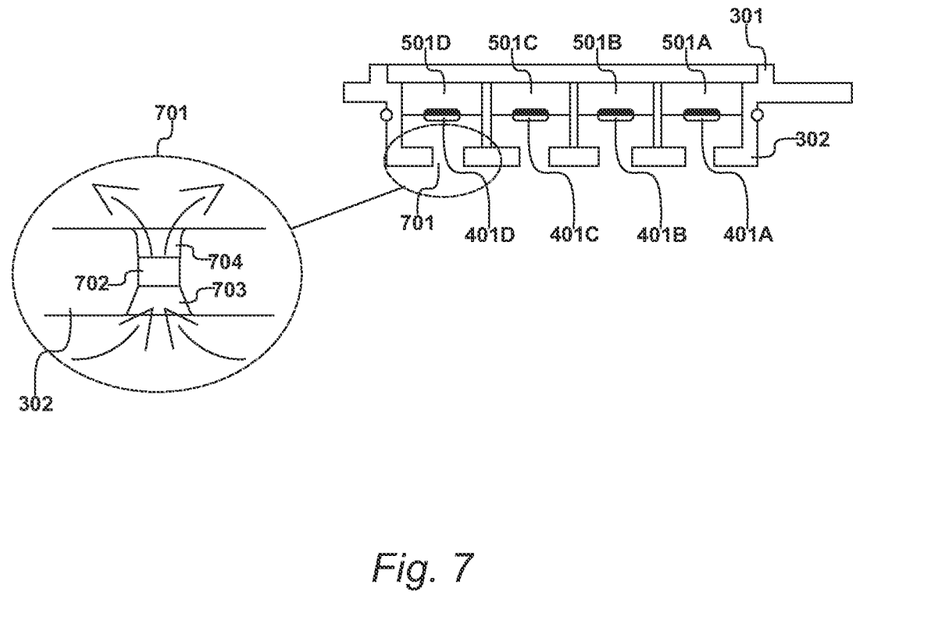
FIG. 7 shows a cross-sectional view of an apparatus for detecting a puncture hole.

A cross-sectional view of apparatus 301 is shown in FIG. 7 highlighting additional features of apparatus 301.

Apparatus 301 is now shown in non-exploded form with cover 304 secured in housing 302 with each detection element mounted on the axle in their respective compartments of housing 302. As described, each compartment comprises at least one opening, and, in this illustrated example, compartment 501D comprises opening 701. It is appreciated that opening 701 is substantially similar to the other openings in any of the other compartments in housing 302.

Opening 701 is shown in further detail at the left of FIG. 7, in a zoomed-in view. Opening 701 comprises a channel 702 in housing 302 which comprises a venturi arrangement.

In the embodiment, the venturi comprises a thirty-degree (30°) inlet channel 703 and a five-degree (5°) outlet channel 704. The venturi is configured to control the air flow from outside the housing 302 and into the compartment 501D so as rotate detection element 401D therein. This will be described further with respect to FIG. 11.

Figure 8A:
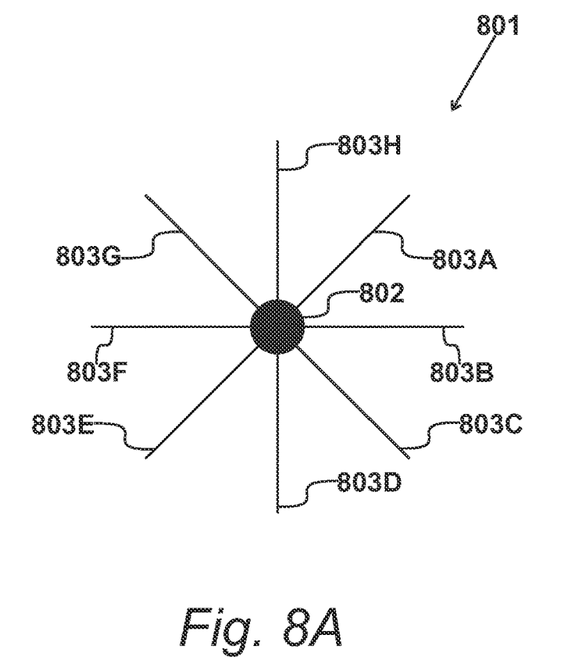
FIGS. 8A and 8B show an alternative example detection element.
Figure 8B:
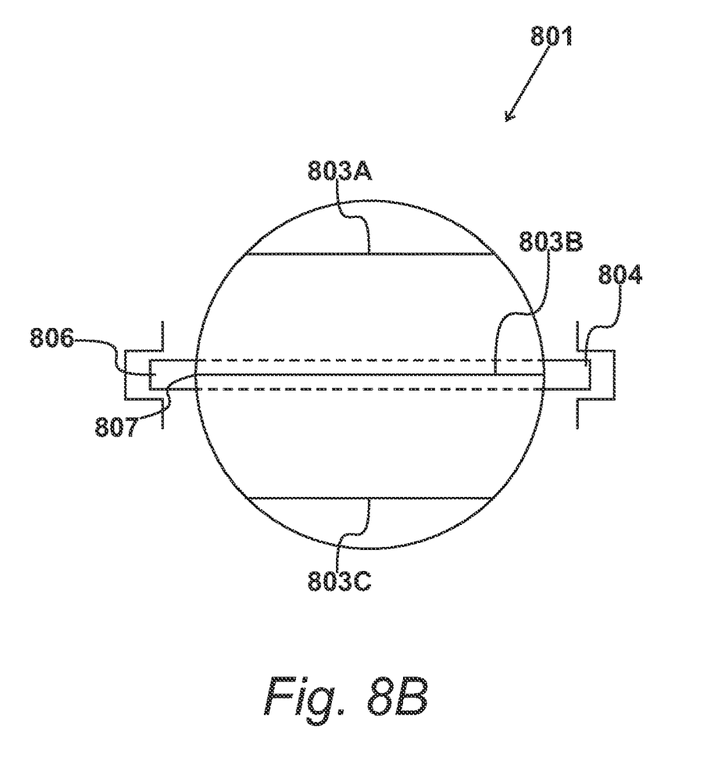

FIG. 8A and FIG. 8B

An alternative example detection element is shown in FIGS. 8A and 8B. FIG. 8 shows an example of a single axle comprising a plurality of detection elements, each of which being configured to rotate about the axle.

FIG. 8A shows a side view of an alternative detection element 801 comprising axle 802. Extending from axle 802 is a plurality of detection elements 803 which are mounted to axle 802 and configured to rotate about the rotational axis of axle 802.

FIG. 8B shows a front view of the detection element 801 showing axle 802 mounted into a socket 804 at end 805 and socket 806 at end 807. Each socket forms part of the housing in which detection element 801 is positioned.

In an embodiment, any one of the detection elements in the housing comprises at least one fin configured to assist with rotation of the detection element. This provides an increase in surface area responsive to the air flowing into the compartment.

FIG. 9

Figure 9:
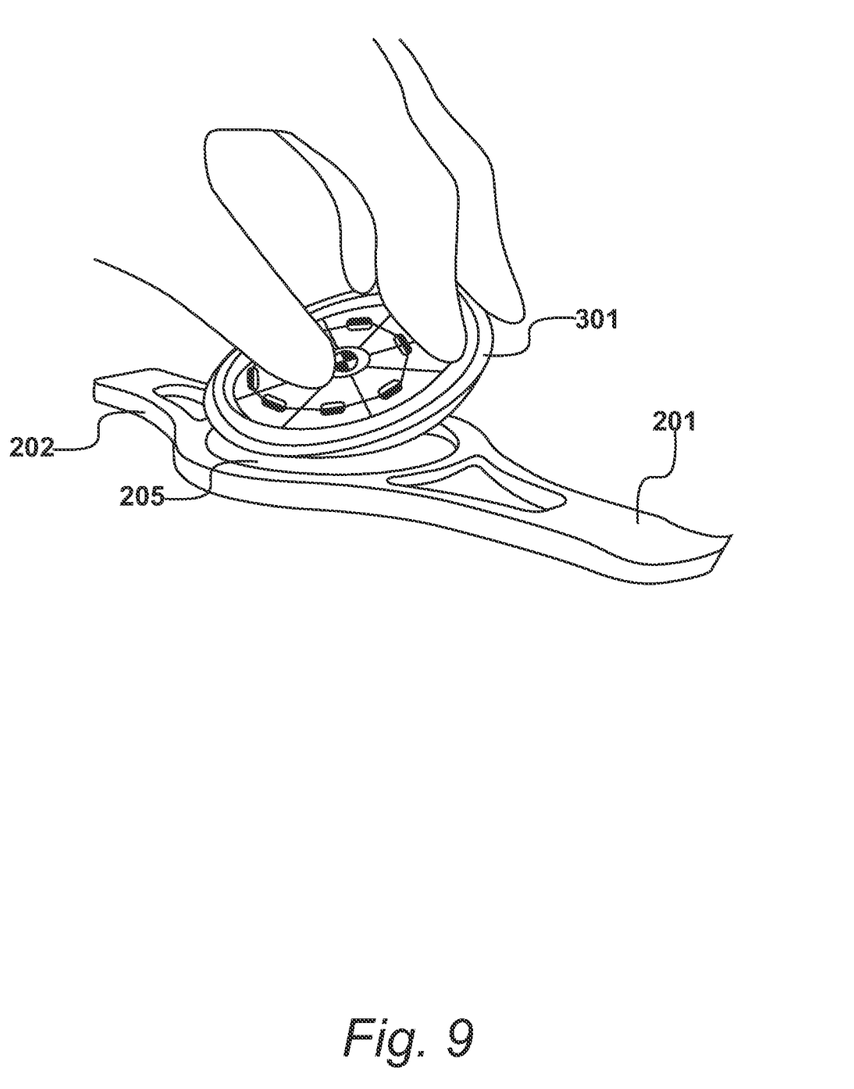
FIG. 9 shows a method of detecting a puncture hole.

A method of detecting a puncture hole utilizing apparatus 301 involves an operative, such as cyclist 101, receiving apparatus 301 and positioning apparatus 301 into aperture 205 of first elongate portion 202 of apparatus 201. In this way, it is appreciated that housing 302 of apparatus 301 is suitably dimensioned to co-operate with aperture 205 such that apparatus 301 can removably fit into aperture 205.

FIG. 10

Figure 10:
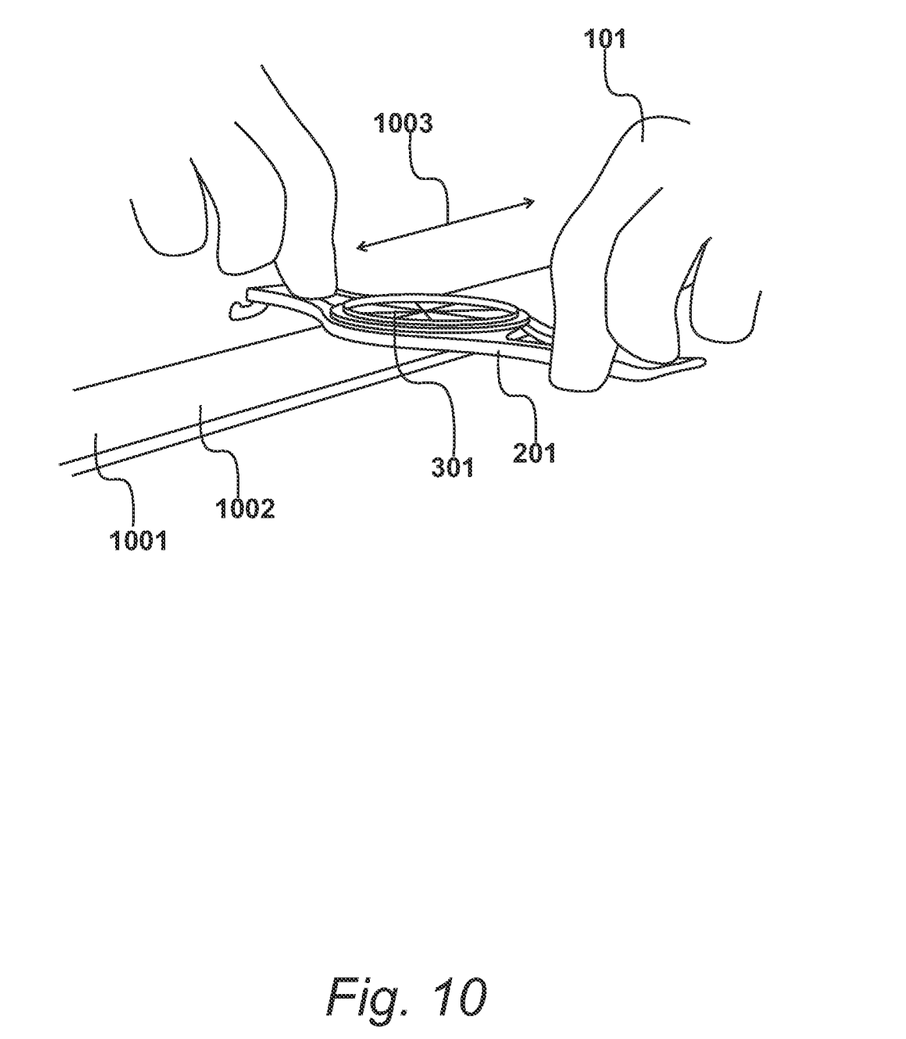
FIG. 10 shows a further step in the method of detecting a puncture hole.

Once apparatus 301 is positioned into aperture 205 of apparatus 201 as shown in FIG. 10, the combined apparatus can be placed onto a punctured inner tube 1001 so as to ascertain the location of the puncture hole in inner tube 1001.

First elongate portion 202 is therefore positioned onto the inner tube 1001 such that the underside of housing 302 contacts inner tube 1001. In use, therefore, operative 101 moves apparatus 301 and apparatus 201 in combination along the surface 1002 of inner tube 1001 in the direction of arrow 1003 to identify the location of the puncture hole.

While the illustrated embodiment illustrates the use of apparatus 301 in combination with apparatus 201, it is appreciated that the location of a puncture hole using device 301 can be achieved without the use of device 201. However, it is further appreciated that combining the two apparatus together can provide a number of additional advantages in terms of locating and retaining the location of the puncture hole once it has been effectively found.

FIG. 11

Figure 11:
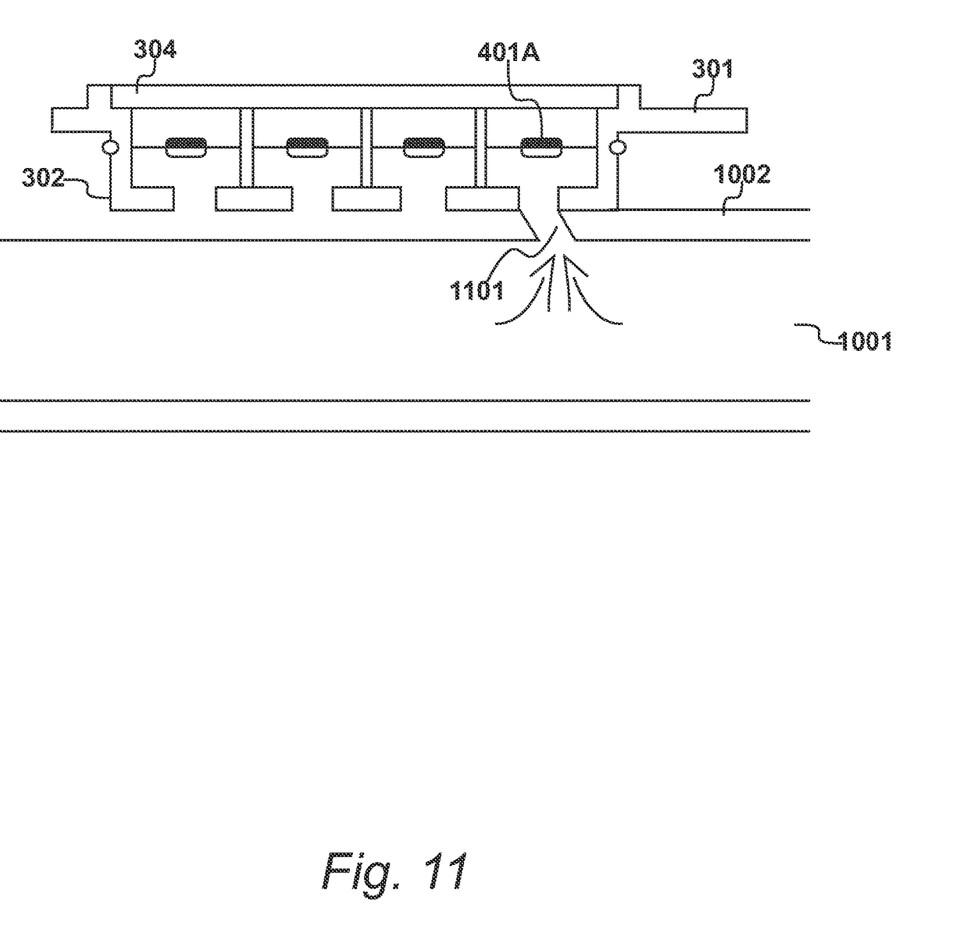
FIG. 11 shows a schematic cross-sectional view of a method of detecting a puncture hole.

By moving apparatus 301 along surface 1002 of inner tube 1001, puncture hole 1101 can be identified. In the embodiment, housing 302 is positioned in contact with surface 1002 and moved across the area in which puncture hole 1101 is located.

In FIG. 11, housing 302 is present over puncture hole 1101 such that puncture hole 1101 is substantially aligned with the opening of compartment 501A. Emphasized by the venturi effect, as puncture hole 1101 coincides with the opening, detection element 401A rotates as the flow of air from inside inner tube 1001 passes through the opening as the opening passes over the puncture hole.

By viewing through cover 304, the operative can note, from the change in the visual pattern of detection element 401A, brought on by its rotation, that detection element 401A has moved, thereby indicating the location of the puncture hole 1101.

When used in combination with apparatus 201, apparatus 201 can then be clamped to ensure the location of puncture hole 1101 is retained.

FIG. 12

Figure 12:
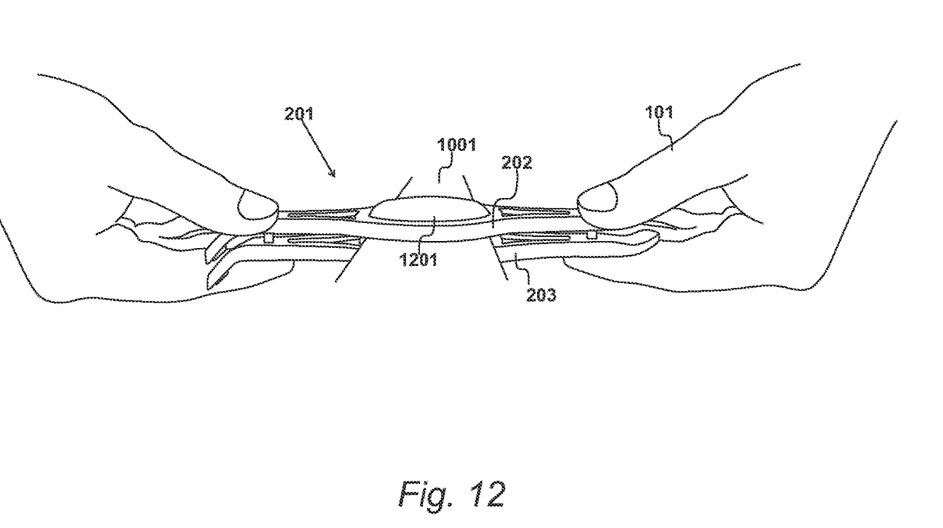
FIG. 12 shows the securing of the first and second elongate portions of a repair device together.

Once the puncture hole has been located, first elongate portion 202 can be aligned with the puncture hole on the top side of inner tube 1001. Visual indicators 210 can be utilized to ensure alignment is made and that the puncture hole is substantially central in respect to aperture 205.

Either separately, or at a substantially simultaneous instant, second elongate portion 203 is aligned with first elongate portion 202 on the underside of inner tube 1001. Thus, in this way, first elongate portion 202 and second elongate portion 203 sandwich inner tube 1001 with the puncture hole positioned centrally to aperture 205. FIG. 12 illustrates the securing of first elongate portion 202 to second elongate portion 203.

In the embodiment, first elongate portion 202 is aligned with the puncture hole on top side of inner tube 1001. Second elongate portion 203 is also aligned with inner tube 1001 on its underside. A force is then applied by operative 101 to each end of the elongate portions simultaneously to temporarily secure apparatus 201 around inner tube 1001.

First elongate portion 202 is secured to second elongate portion 203 by clamping means 204 around inner tube 1001. The clamping means 204 connects the two elongate portions while inner tube 1001 fits between the two elongate portions. In this way, protrusion 211 pushes inner tube 1001 through aperture 205. Protrusion 211 also extends through aperture 205 so as to raise inner tube 1001 and its respective puncture hole through and above aperture 205 so as to assist in repairing the puncture hole. This creates a raised portion 1201 which is supported by protrusion 211.

Thus, inner tube 1001 and its respective puncture hole is now in a position where it can be repaired. This will be described further with respect to FIG. 13.

FIG. 13

Figure 13:
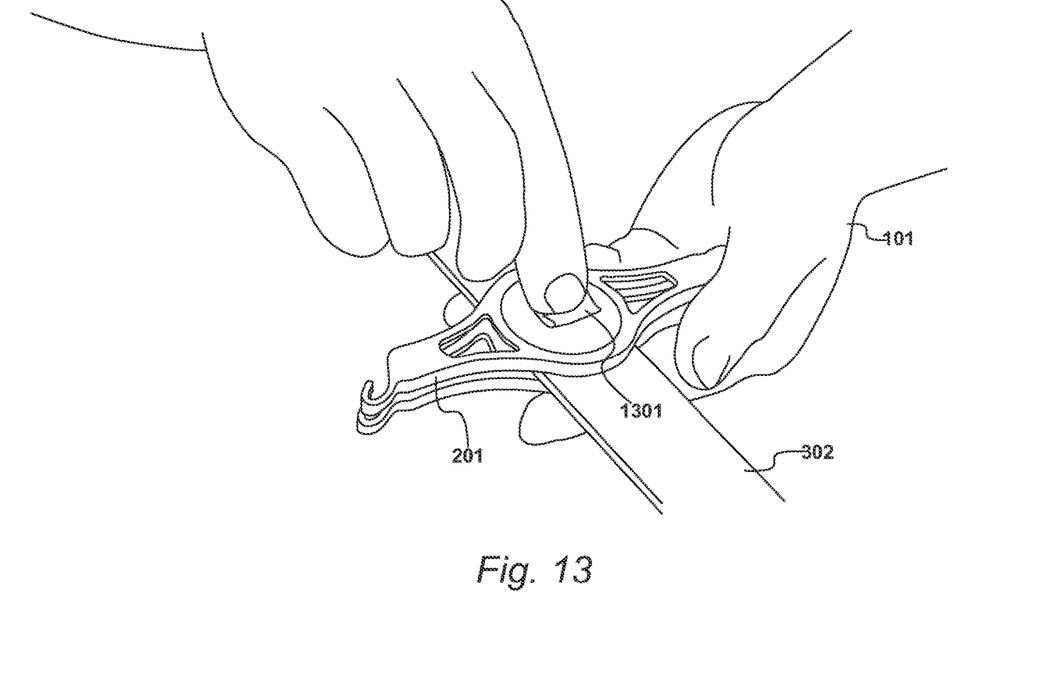
FIG. 13 shows the repair of the puncture hole once located.

Repair of the puncture hole is shown in FIG. 13. In an embodiment, a kit of parts is provided, preferably in the form of a portable tool kit, comprising apparatus 201 and apparatus 301 in combination with a puncture repair patch and an abrasive material suitable for sanding or abrading a puncture site.

As shown, detection apparatus 301 is removed from the puncture site to provide access while apparatus 201 is retained in position around inner tube 1001. Thus, operative 101 can now repair the puncture hole. The process of repairing the puncture hole requires sanding using an abrasive material 1301, and once suitably abraded, the puncture site is cleaned and a repair patch can be positioned over the puncture hole.

Once the repair is completed, the first and second elongate portions are removed by unsecuring the clamping means. This is achieved by pulling the two elongate portions apart. Apparatus 201 can then be reused along with apparatus 301.

The invention claimed is:

1. Apparatus for detecting a puncture, comprising:
   a housing comprising a plurality of compartments;
   each said compartment comprising:
   an opening for receiving a flow of air into said compartment, and a detection element mounted on an axle, said axle having a first end and a second end and being secured at said first end and said second end within each said compartment; wherein
   said detection element is rotatable about said axle; and
   when a flow of air passes through said opening into said compartment, said detection element rotates around said axle in response to said flow of air.

2. Apparatus according to claim 1, wherein each said opening comprises a channel comprising a venturi.

3. Apparatus according to claim 2, wherein said venturi comprises a thirty-degree inlet channel and a five-degree outlet channel.

4. Apparatus according to claim 1, wherein said opening is offset from a rotational axis of said axle.

5. Apparatus according to claim 1, wherein each said detection element comprises a visual element to provide an indication of movement.

6. Apparatus according to claim 5, wherein said detection element comprises a first side and a second side and said visual element comprises a first pattern on said first side and a second pattern on said second side.

7. Apparatus according to claim 1, wherein said housing comprises a substantially transparent cover.

8. Apparatus according to claim 1, wherein said plurality of compartments are arranged in concentric circles.

9. Apparatus according to claim 8, wherein said concentric circles comprise a center compartment and an outer circle of compartments.

10. Apparatus according to claim 1, wherein any one of said detection elements comprises at least one fin configured to assist with rotation of said detection element.

11. Apparatus according to claim 1, wherein each said compartment comprises a single detection element only.

12. Apparatus according to claim 1, wherein each said axle comprises a plurality of detection elements, each configured to rotate about said axle.

13. Apparatus according to claim 1, wherein said housing is configured to fit into an aperture of an elongate member of a repair device.

14. A method of detecting a puncture hole, comprising the steps of:
    receiving an apparatus for detecting a puncture, said apparatus comprising a housing comprising a plurality of compartments, each said compartment comprising an opening for receiving a flow of air into said compartments, and a detection element mounted on an axle secured at a first end and a second end in each said compartment;
    positioning said apparatus over an inner tube;
    moving said apparatus along a surface of said inner tube such that a flow of air passes through each said opening when said opening passes over said puncture hole thereby rotating said corresponding detection element around said axle; and
    identifying a location of said puncture hole.

15. A method according to claim 14, further comprising the step of:
    positioning said apparatus for detecting a puncture in a first elongate portion of a repair device.

16. A method according to claim 15, further comprising the step of:
    securing said repair device around said inner tube at said location of said puncture hole.

17. A method according to claim 16, wherein said step of securing said repair device pushes said apparatus out of said first elongate portion.

18. A method according to claim 15, wherein said step of securing said repair device further comprises securing said first elongate portion to a second elongate portion of said repair device.

* * * * *